July 28, 1931. C. J. SUNDELL 1,816,301
HOSE CLAMP
Filed July 7, 1930
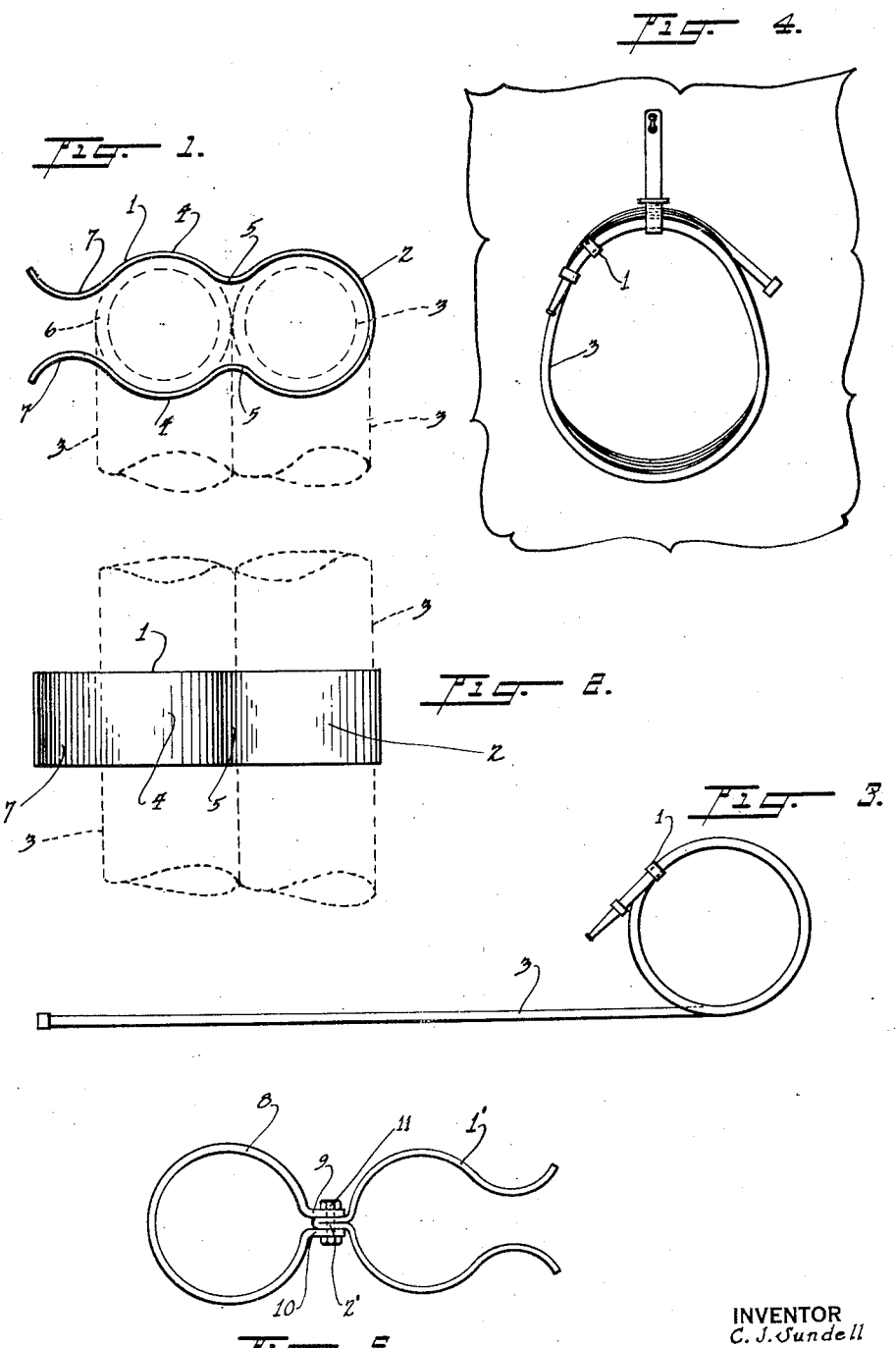
INVENTOR
C. J. Sundell
BY
ATTORNEYS Patented July 28, 1931

1,816,301

UNITED STATES PATENT OFFICE

CARL J. SUNDELL, OF CHICAGO, ILLINOIS

HOSE CLAMP

Application filed July 7, 1930. Serial No. 466,279.

My invention relates to improvements in hose clamps, and it consists in the combinations, constructions, and arrangements herein described and claimed.

An object of my invention is to provide a hose clamp for detachably connecting one portion of a hose with another portion, whereby the hose may be easily coiled up after being used.

A further object is to provide novel means for holding the end of a hose whereby the hose may be coiled, the coils being uniform.

A further object is to provide novel means whereby a hose may be easily coiled by hand so that the water, contained therein after use, will be drained therefrom.

A further object is to provide a hose clamp which is simple in construction, durable, and efficient for the purpose intended.

Other objects and advantages will appear in the following specification, and the novel features of the invention will be particularly pointed out in the appended claims.

My invention is illustrated in the accompanying drawings, forming part of this application, in which Figure 1 shows my device as applied for detachably connecting two portions of a coiled hose together, Figure 2 is a top plan view of the device as shown in Figure 1, Figure 3 shows the device as applied to the hose during the process of coiling the hose, Figure 4 shows my device secured to the hose when the hose is not in use, and Figure 5 is a modified form of my device as applied to the standard hose clamp.

In carrying out my invention I provide a clamping or body member 1 formed of resilient strip material such as sheet steel or the like. A central portion 2 of the body member 1 is annularly shaped or circularly formed in cross section to substantially conform to the shape of a round member 3 in cross section, such as a hose. The central portion 2 is formed for extending more than half way around the hose, or in other words, is more than a semicircle in cross section, whereby the hose may be held within the arcuately-shaped portion 2.

The adjoining portions of the central portion of the body member are provided with outwardly extending arcuate-shaped portions 4 and inwardly extending portions 5, said portions being in alternating positions. The arcuate-shaped portions are formed to conform to the arc of a round member in cross section, such as the hose 3. The outwardly extending portions 4 are adapted for receiving and retaining a portion 6 of the hose 3. The inwardly extending portions 5 are for the purpose of holding the portions of the hose 3 within their respective arcuately-shaped portions of the body member.

The body member 1 is provided with inwardly extending and arcuately-shaped ends 7 which, besides serving in the manner that the inwardly extending portions 5 do, also provide means whereby the body member 1 may be sprung for inserting the hose portions therebetween and thence into the positions in which they are held by the clamping member.

Figure 5 shows the manner in which my device may be adapted for being attached to the standard hose clamp 8. The hose clamp 8 is a standard means for connecting the nozzle, or the means for securing the hose to the faucet, to the hose proper. The hose clamp 8 comprises a circularly-shaped piece of strip material for extending around the hose portion and provided with outwardly extending flanges 9 and 10 having openings and a fastening member, such as a bolt 11, extending therethrough, whereby the flanges may be fastened together, the pressure of the clamping member 8 on the hose providing the means for frictionally connecting the hose with the nozzle or securing means.

A resilient clamping member 1' is shaped similarly to the clamping member 1, shown in Figure 1, except that it is adapted for receiving only one portion of the hose. The central portion of the clamping member 1' is formed for providing a flange 2' adapted for being disposed between the flanges 9 and 10 of the clamp member 8. The flange 2' is provided with an opening therethrough for receiving the bolt 11 whereby the clamping member 1' may be connected with the clamp member 8.

From the foregoing description of the various parts of the device, the operation thereof may be readily understood. Let us assume that the hose has been in use and it is desired that the same may be coiled for being hung up while not in use. The clamping member 1 is disposed adjacent either end of the hose with which it is desired to begin the coiling operation. In Figure 3 the device is shown connected to the hose adjacent the end having the nozzle connected therewith. Any other portion of the hose may be chosen for being secured by the clamping member according as to the size of the coil in which it is desired that the hose be made.

The clamping member secures the end of the hose, thereby enabling the operator to use both hands for coiling the hose. Thus it will be seen that the hose may be uniformly coiled and that the water contained in the hose will be drained therefrom as the hose is coiled. The clamp is left on the hose while the hose is not in use, as shown in Figure 4. The clamping member 1 is entirely removable from the hose, so that when the hose is in use, the clamping member may be put in the operator's pocket until it is needed.

The clamping member 1' is securely fastened to the hose and is connected therewith while the hose is in use. The advantage of the clamp being firmly connected with the hose is that it is not easily lost or mislaid.

It will be understood, that while I have shown the hose clamp as being adapted for receiving and retaining two portions of a hose, it might readily by constructed for receiving and retaining more than two portions of the hose.

I claim:

1. The combination of a looped clamping member having extending portions, a secondary clamping member having receiving portions and retaining portions, said secondary clamping member being provided with a projecting portion disposed between said extending portions of the looped clamping member, and means for connecting said projecting portion with said extending portions.

2. The combination of a looped hose clamp having extending portions, a secondary hose clamp formed for providing arcuate-shaped receiving portions and retaining portions, said secondary hose clamp being formed for providing a projecting portion receivable between the extending portions of the looped clamping member, and means for connecting said projecting portion with the extending portions of the looped clamping member.

Signed at city of Chicago, in the county of Cook and State of Illinois, this 26th day of June, A. D. 1930.

CARL J. SUNDELL.